United States Patent
Pak

(10) Patent No.: US 7,132,385 B2
(45) Date of Patent: Nov. 7, 2006

(54) HIGH LOADING SUPPORTED CARBON CATALYST, METHOD OF PREPARING THE SAME, CATALYST ELECTRODE INCLUDING THE SAME, AND FUEL CELL INCLUDING THE CATALYST ELECTRODE

(75) Inventor: Chan-ho Pak, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 10/948,538

(22) Filed: Sep. 24, 2004

(65) Prior Publication Data
US 2005/0070427 A1 Mar. 31, 2005

(30) Foreign Application Priority Data
Sep. 27, 2003 (KR) .................. 10-2003-0067180

(51) Int. Cl.
*B01J 21/18* (2006.01)
*B01J 23/00* (2006.01)
*H01M 4/86* (2006.01)
*B22F 9/00* (2006.01)
*B22F 1/00* (2006.01)

(52) U.S. Cl. ................ 502/185; 502/182; 429/40; 429/41; 429/42; 429/43; 429/44; 75/245; 75/255

(58) Field of Classification Search ............... 502/182, 502/185; 429/40–44; 75/245, 255
See application file for complete search history.

(56) References Cited

U.S. PATENT DOCUMENTS

| | | | |
|---|---|---|---|
| 4,316,944 A * | 2/1982 | Landsman et al. ........... 429/44 |
| 4,716,087 A * | 12/1987 | Ito et al. ..................... 429/40 |
| 4,806,515 A * | 2/1989 | Luczak et al. ............ 502/185 |
| 5,225,391 A * | 7/1993 | Stonehart et al. .......... 502/324 |
| 5,489,563 A * | 2/1996 | Brand et al. ............... 502/185 |
| 5,876,867 A * | 3/1999 | Itoh et al. ................... 429/44 |
| 6,498,121 B1 * | 12/2002 | Gorer .......................... 502/325 |
| 6,649,300 B1 * | 11/2003 | Ito et al. .................... 429/44 |
| 6,723,678 B1 * | 4/2004 | Gorer .......................... 502/326 |
| 2003/0096156 A1 * | 5/2003 | Asaoka et al. .............. 429/44 |
| 2004/0166396 A1 * | 8/2004 | Gorer .......................... 429/40 |
| 2004/0219420 A1 * | 11/2004 | Tada et al. .................. 429/44 |
| 2005/0031926 A1 * | 2/2005 | Sugimasa et al. .......... 429/30 |

* cited by examiner

*Primary Examiner*—David Sample
*Assistant Examiner*—Patricia L. Hailey
(74) *Attorney, Agent, or Firm*—H.C. Park & Associates, PLC

(57) ABSTRACT

The present invention is related to a high loading supported carbon catalyst having Pt or a Pt alloy supported into an electrically conductive carbon support. Specifically, in the carbon supported catalyst, a loading of the supported Pt or Pt alloy is in the range of about 50% to about 60% by weight, an average particle size is about 1 nm to about 3 nm, and a total specific surface area of the carbon supported catalyst is greater than about 200 $m^2/g$. The carbon supported catalyst may improve the performance of a fuel cell because the catalytic metal particles have a small size and a high degree of dispersion. Also, a carbon supported catalyst having very fine catalyst particles uniformly dispersed may be prepared even at a high loading may be prepared.

9 Claims, 4 Drawing Sheets

HIGH LOADING SUPPORTED CARBON CATALYST, METHOD OF PREPARING THE SAME, CATALYST ELECTRODE INCLUDING THE SAME, AND FUEL CELL INCLUDING THE CATALYST ELECTRODE

CROSS-REFERENCE TO RELATED APPLICATIONS

This application claims the benefits of Korean Patent Application No. 2003-67180, filed on Sep. 27, 2003, in the Korean Intellectual Property Office, the disclosure of which is incorporated herein in its entirety by reference.

FIELD OF THE INVENTION

The present invention is related to a high loading supported carbon catalyst. More particularly, the present invention is related to a high loading supported carbon catalyst having a small size and a high degree of dispersion, a method of preparing the same, a catalyst electrode including the same, and a fuel cell including the catalyst electrode.

BACKGROUND

Fuel cells are power generating systems that convert energy produced through an electrochemical reaction of fuel and oxidative gas directly into electric energy. Such fuel cells can be categorized into electrolyte fuel cells containing molten carbonate salt, which are operable at a temperature between 500° C.–700° C., electrolyte fuel cells containing phosphoric acid, which are operable around 200° C., and alkaline electrolyte fuel cells and polymer electrolyte fuel cells, which are operable between room temperature and 100° C.

The polymer electrolyte fuel cells include proton exchange membrane fuel cells (PEMFCs) which use hydrogen gas as the fuel source and direct methanol fuel cells (DMFCs) which use liquid methanol directly applied to an anode as the fuel source. The polymer electrolyte fuel cells, which are emerging as a next generation clean energy source alternative to fossil fuels, have high power density and high energy conversion efficiency. In addition, the polymer electrolyte fuel cells function at an ambient temperature and are easy to hermetically seal and miniaturize. Therefore, they can be extensively applied to zero emission vehicles, power generating systems for home use, mobile telecommunications equipment, medical equipment, military equipment, space equipment, and the like.

The basic structure of a PEMFC as a power generator producing a direct current through the electrochemical reaction of hydrogen and oxygen is shown in FIG. 1. Referring to FIG. 1, the PEMFC includes a proton-exchange membrane 11 interposed between an anode and a cathode.

The proton-exchange membrane 11 is composed of a solid polymer electrolyte with a thickness of 50–200 μm. The anode and cathode respectively include anode and cathode backing layers 14 and 15 for supplying reaction gases, and catalyst layers 12 and 13, in which the oxidation/reduction of reaction gases occurs, thereby forming the gas diffusion electrodes (hereinafter, the anode and cathode will be referred to as "gas diffusion electrodes"). In FIG. 1, a carbon sheet 16 has gas injection holes and acts as a current collector. Hydrogen, as a reactant gas, is supplied to the PEMFC, and hydrogen molecules decompose into protons and electrons through an oxidation reaction in the anode. These protons reach the cathode via the proton-exchange membrane 11.

Meanwhile, in the cathode, oxygen molecules receive the electrons from the anode and are reduced to oxygen ions. These oxygen ions react with the protons from the anode to produce water. As shown in FIG. 1, within the gas diffusion electrodes of the PEMFC, the catalyst layers 12 and 13 are formed on the anode and cathode backing layers 14 and 15, respectively. The anode and cathode backing layers 14 and 15 are composed of carbon cloth or carbon paper. The surfaces of the anode and cathode backing layers 14 and 15 are treated so that reaction gases and water can easily permeate into the proton-exchange membrane 11 before and after reaction.

Although a DMFC has the same structure as a PEMFC, it uses methanol in a liquid state instead of hydrogen as a reaction gas, which is supplied to anode to produce protons, electrons, and carbon dioxide through an oxidation reaction by aid of a catalyst. The DMFC has inferior cell efficiency to the PEMFC, but since the fuel is injected in a liquid state, the DMFC can be more easily applied to portable electronic devices than the PEMFC.

To improve the power density and voltage of a fuel cell, studies of electrodes, fuels, and electrolyte membranes are being actively conducted. In particular, an attempt has been made to improve the activity of a catalyst used in the electrode. A catalyst used in the PEMFC or the DMFC is generally Pt or an alloy of Pt and another metal. To ensure a competitive price, it is necessary to reduce an amount of the metallic catalyst used. Thus, to reduce the amount of the catalyst while retaining or improving performance of a fuel cell, an electrically conductive carbon material with broad specific surface area has been used as a support and Pt has been dispersed as fine particles in the support, thereby increasing the electrochemically active surface area of the catalytic metal particles.

As the electrochemically active surface area of a catalyst increases, the activity of the catalyst is improved. To improve the electrochemically active surface area of the catalyst, an amount of a supported catalyst used in the electrode can be increased. In so doing, however, the amount of carbon support used is increased and thus the thickness of the electrodes is increased. As a result, the inner resistance of the electrode increases making it difficult to form an electrode. Accordingly, it is necessary to increase the loading of the supported catalyst while retaining the amount of the support used. However, a high degree of dispersion may be obtained by preparing very fine catalytic metal particles when preparing a high loading supported catalyst. In the case of a conventional supported Pt catalyst, the loading of supported Pt is 20–40% by weight. According to Antolini et al., 78 MATERIALS CHEMISTRY AND PHYSICS 563 (2003), in the case of a commercial catalyst available from E-TEK, if the loading of a Pt metal particle in a catalyst is increased from 20% by weight to 60% by weight, the size of the Pt particles increases about 4 times. Thus, although such a catalyst is used in a fuel cell, the benefit of increasing the loading of the supported catalytic metal is not obtained.

U.S. Pat. No. 5,068,161 discloses a solvent reduction method in which $H_2PtCl_6$ as a catalytic metal precursor is dissolved in an excessive amount of water as a solvent, and reduced using formaldehyde as a reducing agent. Then, the solution is filtered to remove the solvent and dried in a vacuum to prepare a supported Pt alloy catalyst. However, the size of the catalytic metal particles varies according to the reducing agent and when the concentration of the is catalytic metal is greater than 30% by weight; the catalytic metal particles become excessively large.

In contrast, a method of preparing a carbon supported catalyst in which a catalytic metal precursor is dissolved in an excessive amount of solvent, where the solution is impregnated into a carbon support and subsequently dried to remove the solvent is disclosed in Wendt, 43 ELECTROCHIM. ACTA, 3637 (1998). In so doing, however, a concentration gradient is generated upon drying, thereby causing a capillary phenomenon. Thus, the capillary phenomenon results in an accumulation of the metal salt onto the pore surface of the carbon support. Also, as the loading of the catalyst increases, the size of the catalytic metal particle also increases.

SUMMARY OF THE INVENTION

The present invention is directed to a high loading supported carbon catalyst having very fine metal particles and a high degree of dispersion. Additionally, the present invention also provides a method of preparing the high loading supported carbon catalyst. Moreover, the present invention is related to a catalyst electrode which includes the high loading supported carbon catalyst. The present invention also provides a fuel cell including the catalyst electrode.

According to an aspect of the present invention, there is provided a high loading supported carbon catalyst having Pt or a Pt alloy supported onto an electrically conductive carbon support. The concentration of the supported Pt or Pt alloy is in the range of about 50% to about 60% by weight, has an average particle size in the range of about 1 nm to about 5 nm, and has a specific surface area of greater than about 200 $m^2/g$. The carbon support may be activated carbon, carbon black, mesoporous carbon, or carbon nanotube.

According to another aspect of the present invention, there is provided a method of preparing a high loading supported carbon catalyst having a supported catalytic metal with a loading in the range of about 30% to about 60% by weight. The method comprises impregnating at least two times a small amount of a solvent and a catalytic metal precursor by dividing the catalytic metal precursor into two or more sections, drying and then reducing a carbon support having the impregnated catalytic metal precursor between the impregnations.

According to another aspect of the present invention, there is provided a catalyst electrode for a fuel cell including the high loading supported carbon catalyst. In a further aspect, there is provided a fuel cell including the catalyst electrode.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

Figure 1:
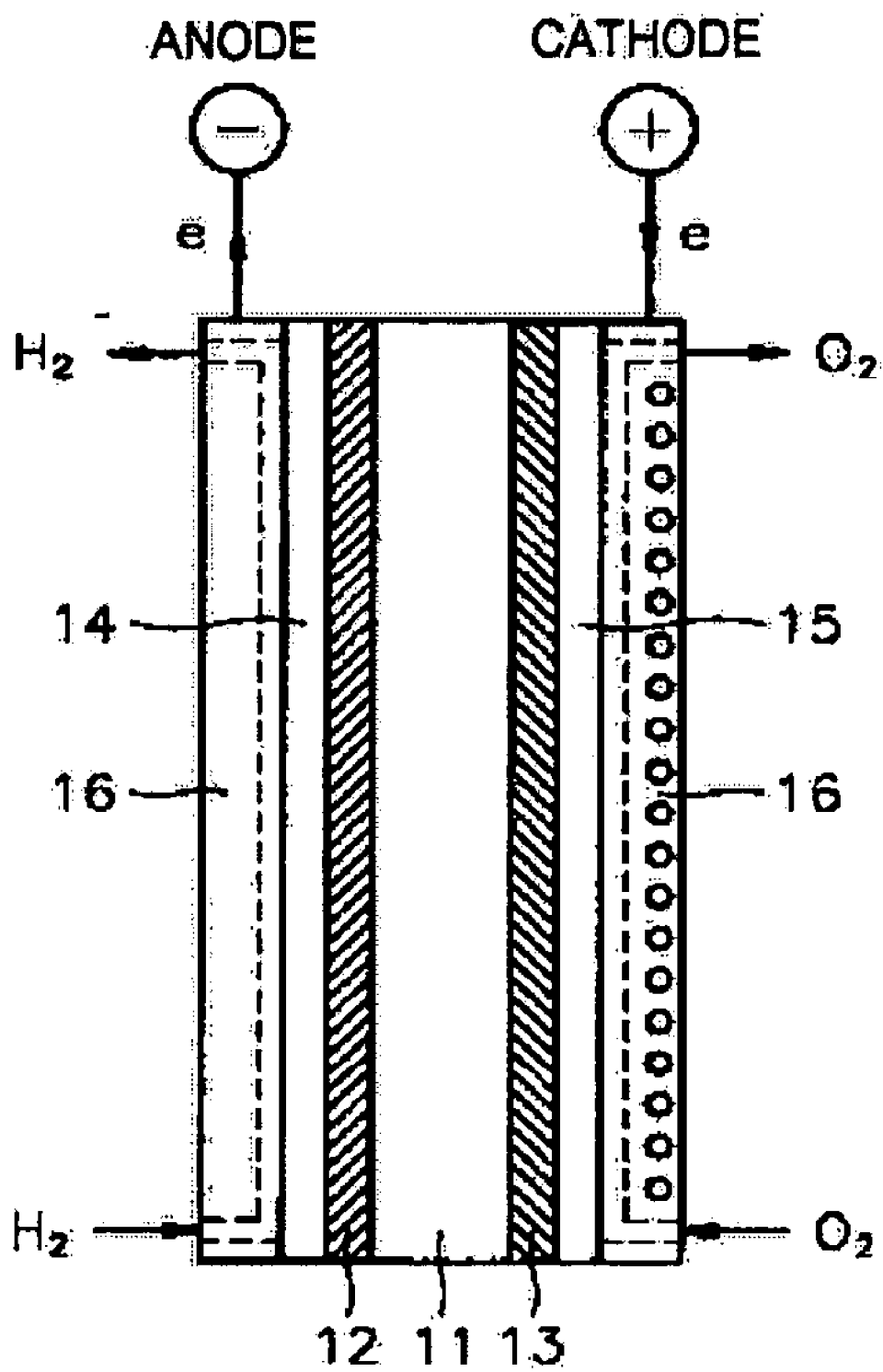
FIG. 1 is a schematic diagram of a proton exchange membrane fuel cell.

A high loading supported carbon catalyst according to an embodiment of the present invention may have an average particle size in the range of about 1 nm to about 5 nm and a specific surface area of greater than about 200 $m^2/g$. Therefore, the catalyst may be highly dispersed with a loading in the range of about 50% to about 60% by weight. When an amount of a supported catalytic metal is more than 60% by weight, the average particle size of the catalytic metal may be too large to obtain the benefit of the high loading of the catalytic metal particles. Additionally, it is difficult to prepare the catalytic metal with an average particle size less than 1 nm and when the average particle size is greater than 5 nm, the effective surface area of the catalyst particle undesirably decreases. Also, the specific surface area of the catalyst is determined using a BET equation after measuring the nitrogen adsorption.

A carbon support used in the present invention may be activated carbon, carbon black, mesoporous carbon, or carbon nanotube, but is not limited thereto. The carbon support may have a specific surface area of greater than about 800 $m^2/g$. When the specific surface area is less than about 800 $m^2/g$, it is difficult to obtain catalytic metal particles smaller than 5 nm with a high loading.

The Pt alloy used in the present invention may be an alloy of Pt and Ti, Cr, Mn, Fe, Co, Ni, Cu, Ga, Zr, Hf, Ru, Ir, Pd, Os, Au, Ag or a mixture thereof, for example. In a direct methanol fuel cell (DMFC), methanol is oxidized to generate carbon monoxide, which causes poisoning of a Pt catalyst. To prevent this poisoning, the Pt alloy catalyst may be used.

The high loading supported carbon catalyst according to another embodiment of the present invention may be prepared by impregnating a small amount of solvent and a catalytic metal precursor two or more times. This may be accomplished by dividing the catalytic metal precursor to be finally impregnated into two or more units. Subsequently, the carbon support having the impregnated catalytic metal precursor is dried and reduced between the impregnations. The impregnation may be performed two or more times. In particular, the impregnation may be performed two times.

In a further specific embodiment, a method of preparing a high loading supported carbon catalyst including a catalytic metal supported with a loading in the range of about 30% to about 60% by weight includes (1) impregnating a metal precursor solution comprising a small amount of a solvent and a catalytic metal precursor where a portion of the catalytic metal precursor is impregnated into a carbon support; (2) drying the carbon support having the impregnated catalytic metal precursor; (3) reducing the carbon support having the impregnated catalytic metal precursor; (4) impregnating a metal precursor solution comprising a small amount of the solvent and the remaining portion of the catalytic metal precursor where the remaining portion of the catalytic metal precursor is impregnated into the carbon support having the preliminary loaded catalytic metal particles; (5) drying the carbon support having the impregnated catalytic metal precursor and the metal particles; and (6) reducing the carbon support having the impregnated catalytic metal precursor and the metal particles.

More specifically, a catalytic metal precursor may not be impregnated into a carbon support to prepare a high loading supported carbon catalyst with about 30% by weight or more of supported catalytic metal particles and a high degree of dispersion. Alternatively, a portion of the catalytic metal precursor to be impregnated may be dissolved in a small amount of solvent and may be subjected to a first impregnation into a carbon support and a first reduction, and then, a remaining portion of the catalytic metal precursor may be subjected to a second impregnation into the carbon support and a second reduction. That is, the impregnation and the reduction may each be performed two times.

According to an embodiment of the present invention, the solvent may be acetone and only about 0.5 ml to about 3 ml may be used per 1 g of the carbon support. Thus, the solvent may be easily removed. Consequently, a capillary phenomenon due to a concentration gradient will not occur during drying because the solvent does not need to be rapidly removed.

In general, when using a conventional impregnation method to produce a high loading supported carbon catalyst having catalytic metal particles of at least 50% by weight, the catalytic metal precursor is excessively present on the surface of the carbon support. As a direct result, the reduction of the catalytic metal precursors will produce undesirably large catalytic metal particles. In contrast, according to an embodiment of the present invention, however, the catalytic metal precursor may be used two or more times. In so doing a portion of the catalytic metal precursor initially impregnated into the carbon support surface may be reduced into fine catalytic metal particles allowing the carbon support surface to be exposed again.

More specifically, since only a portion of the total amount of the catalytic metal precursor is used in the first impregnation, the catalyst metal particles produced will be small. Subsequently, the remaining portion of the catalytic metal precursor will be used in the second impregnation and the second reduction, thus the carbon support surface that is externally exposed may be re-used. Consequently, the size of the supported catalytic metal particles will remain small. In other words, the surface area of the carbon support capable of receiving the remaining is portion of the catalytic metal precursor may be increased by converting a portion of the catalytic metal precursor initially impregnated into fine catalytic metal particles following the first reduction. Accordingly, the small catalytic metal particles may be prepared by utilizing an interaction between the catalytic metal particles and the carbon support while minimizing an increase in the size of the catalytic metal particles, which may occur in the second reduction.

According to the present invention, a ratio of the catalyst metal precursor used in the first impregnation and the second impregnation may be a ratio in the range of about 0.4:0.6 to about 0.6:0.4, and in particular may be in a ratio of about 0.5:0.5. The ratio of the catalyst metal precursor used in the first impregnation and the second impregnation may be determined by determining the size of the catalytic metal particle initially produced and the size of the catalytic metal particle subsequently produced. If the ratio is not within the above range, the size of the catalytic metal particles may undesirably increase.

In a method of the present invention, the first reduction of the catalytic metal precursor may be performed using hydrogen gas at a temperature in the range of about 120° C. to about 250° C. and the second reduction of the catalytic metal precursor may be performed using hydrogen gas at a temperature in the range of about 150° C. to about 350° C. The temperature of the second reduction may be higher than that of the first reduction in order to ensure sufficient reduction. When the reduction temperature is lower than about 120° C., the catalytic metal is not sufficiently reduced. In contrast, when the reduction temperature is higher than about 350° C., the catalytic metal particles may move in the carbon surface and aggregate with each other due to the high temperature. Moreover, the temperature for removing the hydrogen may be in the range of about 200° C. to about 400° C. When this temperature is lower than about 200° C., the hydrogen adsorbed to the catalytic metal particle may not be sufficiently removed. Alternatively, when the removing temperature is higher than about 400° C., the catalytic metal particles may aggregate with each other.

The catalytic metal precursor used in the present invention is not particularly restricted as long as it is a soluble salt of a catalytic metal. When the catalyst is an impregnated Pt catalyst, $H_2PtCl_6$ or $PtCl_2$ may be used as the catalytic metal precursor.

The high loading supported carbon catalyst according to an embodiment of the present invention may be used as the active component in the electrode of the fuel cell. The electrode for a fuel cell may be prepared in any conventional manner. For example, the carbon supported catalyst may be dispersed in a solution of an ionomer in isopropyl alcohol to produce a slurry. Then, the slurry may be coated onto a waterproof carbon paper through spray coating and dried to obtain an electrode. The ionomer is not particularly restricted as long as it is a proton conductive polymer, and an example thereof is Nafion.

The present invention provides a fuel cell using the high loading supported carbon catalyst and the fuel cell may be a proton exchange membrane fuel cell (PEMFC) or a DMFC, but is not limited to these.

The present invention will now be described in greater detail with reference to the following examples. The following examples are for illustrative purposes and are not intended to limit the scope of the invention.

EXAMPLES

Specific Example 1

Preparation of a Carbon Supported Catalyst 0.5 g of KBEC with a specific surface area of 800 $m^2/g$, as a carbon support, was placed in a plastic bag and 0.9616 g of $H_2PtCl_6$ was weighed and dissolved in 0.8 ml of acetone in the beaker. The solution was placed in the plastic bag containing the carbon support and thoroughly mixed. Then, 0.35 ml of acetone was further added into the beaker, placed into the plastic bag and mixed. This process was repeated once again with the total amount of acetone added being 1.5 ml. The mixture was air dried for four hours, and then was transferred to a crucible and dried in an oven at a temperature of 60° C. overnight. Then, the crucible was placed in an electric furnace under a nitrogen atmosphere for 10 minutes. Next, the nitrogen gas was exchanged with hydrogen gas, the temperature in the electric furnace was raised from room temperature to 200° C. and maintained for 2 hours in order to reduce the Pt salt impregnated in the carbon support. Next, the hydrogen gas was replaced with nitrogen gas and the temperature in the electric furnace was raised to 250° C., maintained at 250° C. for 5 hours, and then cooled to room temperature. The first reduced sample was removed from the electric furnace and placed in the plastic bag again. Then, the impregnation and reduction, as described above, were repeated to obtain a carbon supported catalyst with an amount of the catalyst impregnated in the first impregnation and an amount of the catalyst impregnated in the second impregnation having a ratio of 0.5:0.5, a total loading of supported Pt equal to 60% by weight, and a specific surface area of 253 $m^2/g$.

Specific Example 2

Preparation of a Carbon Supported Catalyst

A carbon supported catalyst with an amount of the catalyst impregnated in the first impregnation and an amount of the catalyst impregnated in the second impregnation having a ratio of 0.5:0.5, a total loading of supported Pt equal to 50% by weight, and a specific surface area of 297 $m^2/g$ was obtained in the same manner as in Example 1 except that the amount of $H_2PtCl_6$ used in each of the first and second impregnations was 0.6410 g.

Specific Examples 3–9

Preparation of a Carbon Supported Catalyst

Carbon supported catalysts were obtained by varying the type of a carbon carrier, the specific surface area of the carbon support, the amount of a catalyst supported in the first and second impregnation, and the ratio thereof, as depicted in Table 1 below. A particle size was calculated by XRD and a specific surface area of the entire carbon impregnated catalyst was determined, which are also shown in Table 1.

Specific Example 10

Manufacturing of an Electrode for a Fuel Cell

The carbon supported catalyst prepared in Example 1 was dispersed in a solution of Nafion 115 (DuPont, Wilmington, Del.) in isopropyl alcohol to prepare a slurry. The slurry was coated onto a carbon electrode using a spray process in order to obtain the coated catalyst in the amount of 3 $mg/cm^2$ based on a Pt loading. Then, the electrode was passed through a rolling machine to enhance adhesion between the catalyst layer and the carbon cloth, thereby producing a cathode.

Specific Example 11

Manufacturing of an Electrode for a Fuel Cell

A cathode was prepared in the same manner as in Example 10 except that the amount of the catalyst coated was 2 $mg/cm^2$ based on the Pt loading.

Specific Example 12

Manufacturing of an Electrode for a Fuel Cell

The carbon supported catalyst prepared in Example 5 was dispersed in a solution of an ionomer in isopropyl alcohol to prepare a slurry. The slurry was coated onto a carbon electrode using a spray process in order to obtain the coated catalyst in the amount of 3 $mg/cm^2$ based on a Pt loading. Then, the electrode was passed through a rolling machine to enhance adhesion between a catalyst layer and a carbon cloth, thereby obtaining a cathode.

Specific Example 13

Manufacturing of an Electrode for a Fuel Cell

A cathode was prepared in the same manner as in Example 12 except that Pt Black catalyst (Johnson-Matthey, London, Great Britain) was used and the amount of the catalyst coated was 2 $mg/cm^2$ based on the Pt loading.

As seen in Table 1, the catalyst particles in the carbon impregnated catalysts prepared in Example 1–4 are finer and more uniformly dispersed than those produced in Examples 5–9. TEM photographs of carbon impregnated catalysts

TABLE 1

Figure 2:
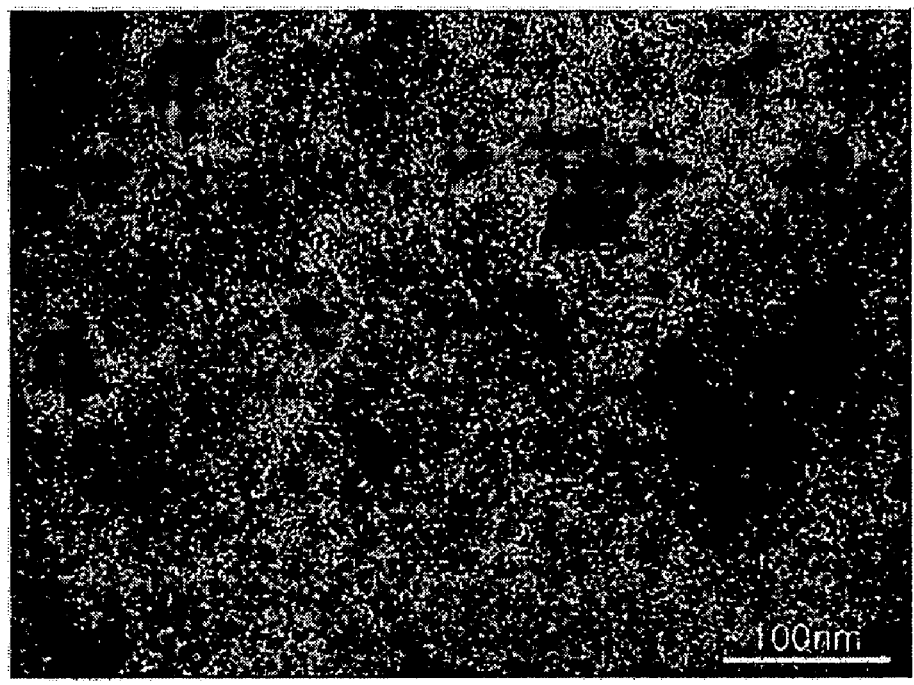
FIG. 2 is a TEM micrograph of a carbon supported catalyst prepared in Example 1 of the present invention.
Figure 3:
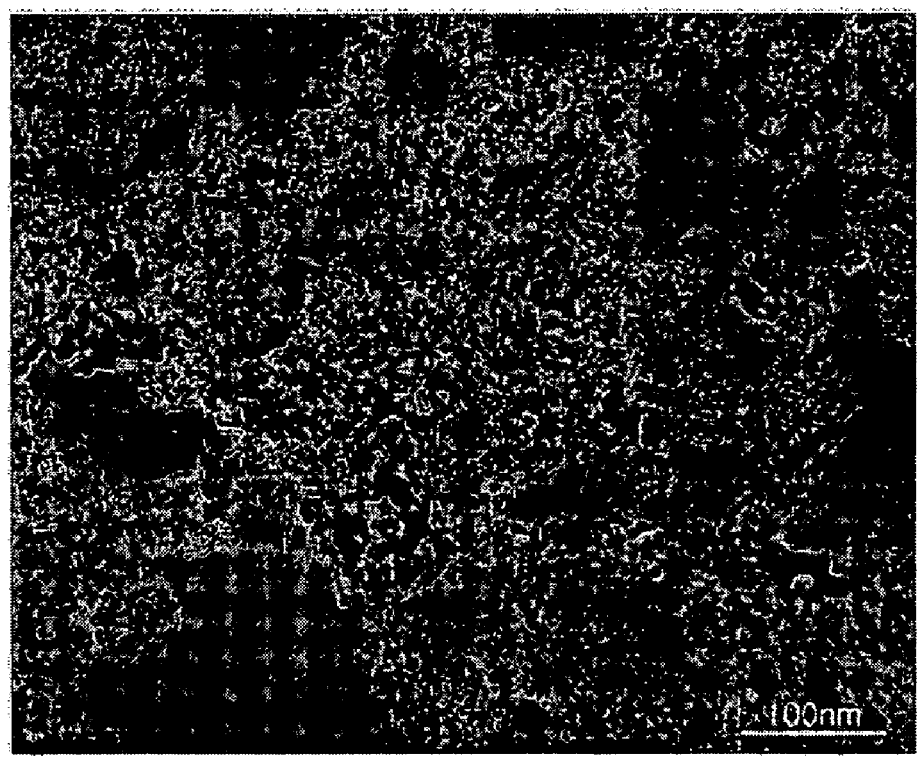
FIG. 3 is a TEM micrograph of a carbon supported catalyst prepared in Example 5.

| Example No. | Carbon carrier | Specific surface area of carbon carrier ($m^2/g$) | Amount of Pt impregnated in first impregnation A(g) | Amount of Pt impregnated in second impregnation B(g) | Impregnation Ratio A:B | Concentration of Pt (% by weight) | Particle Size (nm) | Entire Specific surface area ($m^2/g$) |
|---|---|---|---|---|---|---|---|---|
| 1 | KBEC | 800 | 0.9616 | 0.9616 | 5:5 | 60 | 2.8 | 253 |
| 2 | KBEC | 800 | 0.6410 | 0.6410 | 5:5 | 50 | 2.3 | 297 |
| 3 | KBEC | 800 | 0.7692 | 1.1538 | 4:6 | 60 | 3.7 | 260 |
| 4 | KBEC | 800 | 1.1538 | 0.7692 | 6:4 | 60 | 4.3 | 250 |
| 5 | KBEC | 800 | 1.9232 | — | — | 60 | 5.7 | 250 |
| 6 | VULCAN | 195 | 1.9232 | — | — | 60 | 15.4 | 75 |
| 7 | VULCAN | 195 | 0.9616 | 0.9616 | 5:5 | 60 | 10.3 | 85 |
| 8 | DENKA | 64 | 1.9232 | — | — | 60 | 13.8 | 25 |
| 9 | DENKA | 64 | 0.9616 | 0.9616 | 5:5 | 60 | 11.1 | 30 | prepared in Example 1 and Example 5 are illustrated in FIGS. 2 and 3. Referring to FIGS. 2 and 3, the catalytic metal particles in the carbon supported catalyst prepared in Example 1 of the present invention are about 50% smaller than the catalytic metal particles prepared in Example 5 and are very uniformly dispersed.

The carbon supported catalyst prepared in Example 1 has an average particle size of about 2.6 nm with a standard deviation of 0.5 nm, whereas the catalyst of Example 5 has an average particle size of about 5.2 nm with a standard deviation of 1.5 nm, indicating poor dispersion and increase in particle size when impregnating using the catalyst only once. Thus, according to the present invention, a high loading supported carbon catalyst having finer catalyst particles and a higher degree of dispersion, due to a very uniform distribution of the catalyst particles, than a carbon supported catalyst prepared by a conventional method may be prepared.

Figure 4:
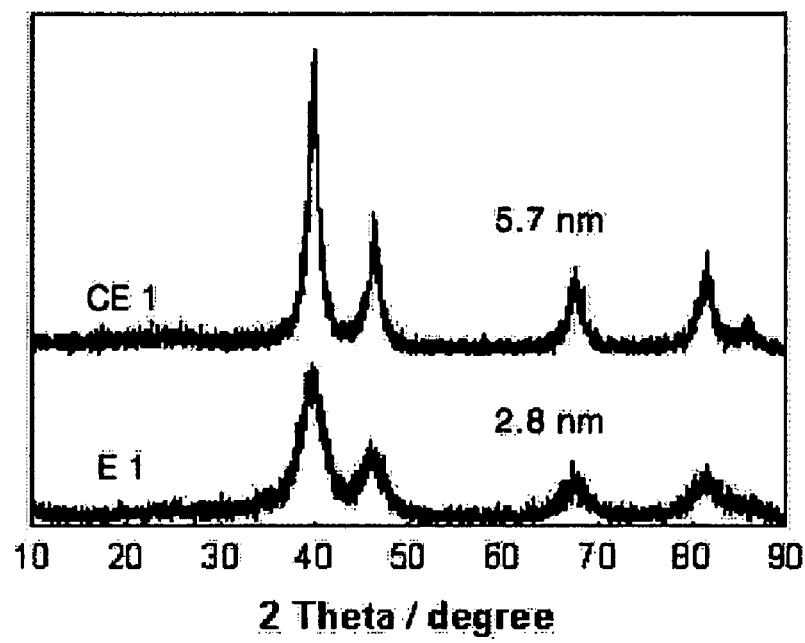
FIG. 4 illustrates x-ray diffraction patterns for carbon supported catalysts prepared in Example 1 of the present invention and Example 5.

FIG. 4 illustrates x-ray diffraction patterns for the carbon supported catalysts prepared in Example 1 and Example 5. Referring to FIG. 4, Pt particles in the supported catalyst of the present invention show an FCC structure of metallic phase without another phase. Also, it is suggested from comparing the broadness of XRD peaks of Example 1 and Example 5 that the size of metal particles of Example 1 are smaller than those of Example 5.

The size of the catalyst particles of Example 1 were determined to be 2.8 nm and the size of the catalyst particles of Example 5 were determined to be 5.7 nm by calculating from the Full Width at Half Maximum (FWHM) of Pt (111) peak in the XRD patterns. This result confirms the tendency of particle size obtained from the TEM. A small variation in the particle size is observed, however, because XRD represents average values within the whole sample region and a value of very fine particle with a size of 2 nm or less is combined with a value obtained from another larger particle, thereby resulting in a larger value than the result obtained through the TEM.

Specific Example 14

Test of Performance of a Unit Cell

Figure 5:
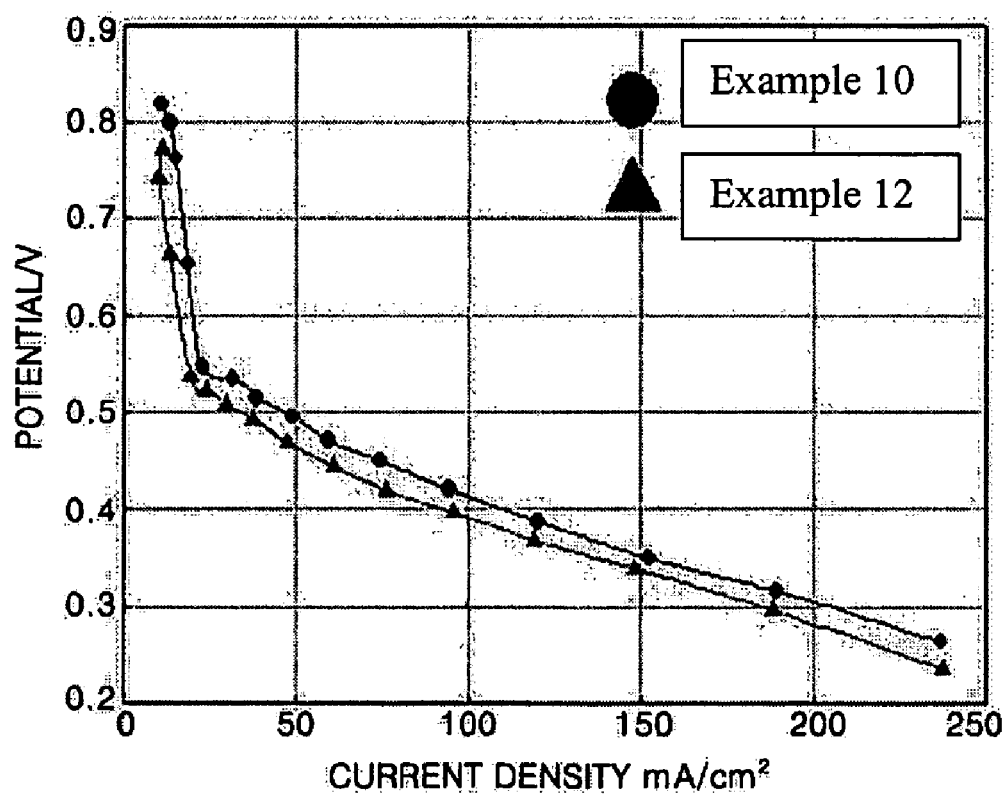
FIG. 5 illustrates performance of unit cells using cathodes prepared in Example 10 of the present invention and Example 12.
Figure 6:
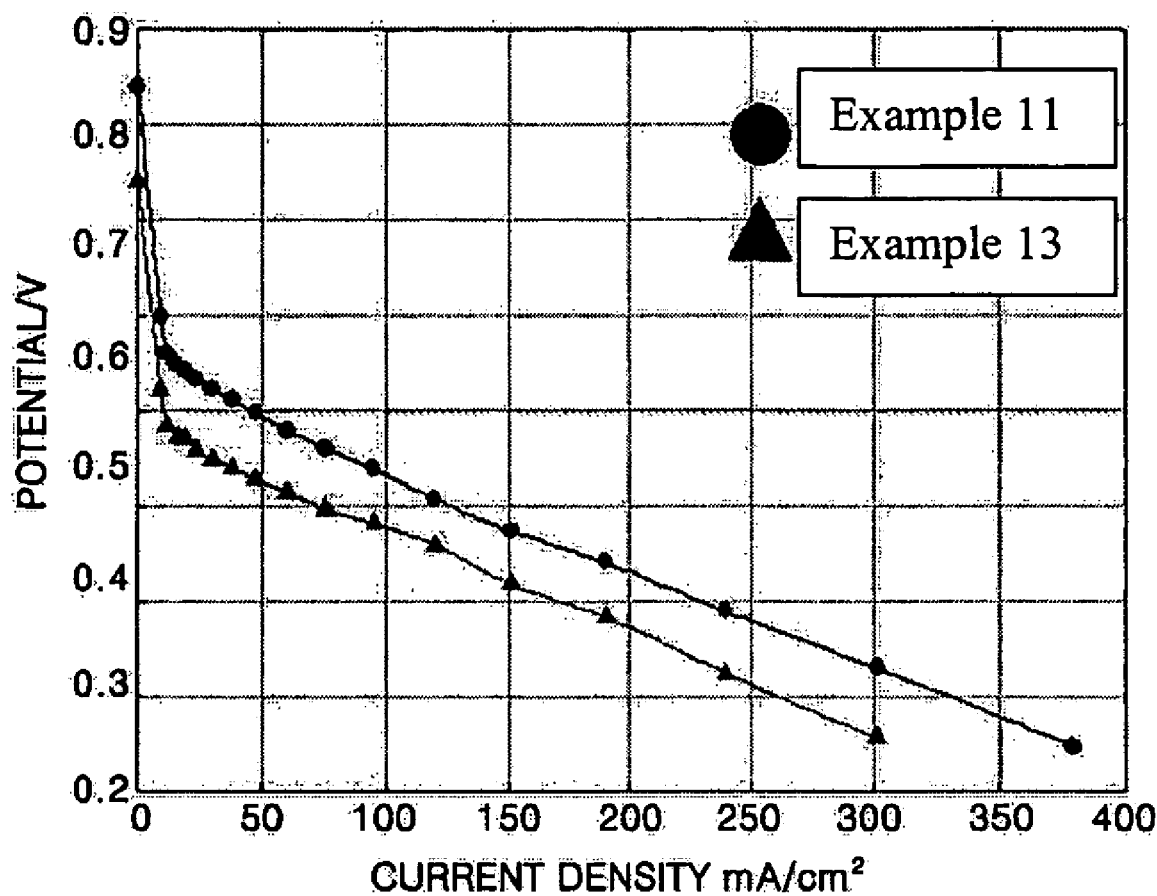
FIG. 6 illustrates performance of unit cells using cathodes prepared in Example 11 of the present invention and Example 13.

The cathodes prepared in Examples 10–11 and Examples 12–13 and an anode prepared using a commercially available PtRu black catalyst were used to prepare unit cells. Then, performances of the unit cells were measured at 40 mA/cm$^2$ while supplying 2M methanol for the anode and excessive air for the cathode. The results are illustrated in FIGS. 5 and 6. Referring to FIG. 5, the unit cell of Example 10 has a higher performance than that of Example 12. In other words, comparing current densities at 40 mA/cm$^2$ and 0.4 V, Example 12 shows a current density of 95 mA/cm$^2$, whereas Example 10 shows a current density of 116 mA/cm$^2$, which is about 20% higher than Example 12. Since cathode catalysts were prepared using supported catalysts with the same loading, the thicknesses of the electrodes were substantially the same. Thus, such increase in the activity may be achieved because the available surface area of the catalyst particle increases due to a decrease in the size of the metal particles.

In addition, referring to FIG. 6, the unit cell using the cathode of Example 11 has considerably higher activity than the unit cell using the cathode of Example 13. In particular, comparing current densities at 40 mA/cm$^2$ and 0.4 V, Example 13 has a current density of 72 mA/cm$^2$, whereas Example 11 has a current density of 127 mA/cm$^2$, which is about 76% higher than Example 13. Accordingly, the carbon supported catalyst according to an embodiment of the present invention can be used to considerably improve performance of a fuel cell.

As described above, the carbon supported catalyst according to an embodiment of the present invention may improve the performance of a fuel cell because the catalytic metal particles have a small size and a high degree of dispersion even though the loading of the catalytic metal is high. Also, in the method according to another embodiment of the present invention, a carbon impregnated catalyst having very fine catalyst particles uniformly dispersed may be prepared, even at a high loading.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing a high loading supported carbon catalyst, comprising:
   first, impregnating an amount of solvent ranging from about 0.5 ml to about 3.0 ml per 1 g of a carbon support and a first portion of a catalytic metal precursor into a carbon support;
   second, drying the carbon support comprising the impregnated catalytic metal precursor;
   third, reducing the carbon support comprising the impregnated catalytic metal precursor using hydrogen gas at a temperature in the range of about 120° C. to about 250° C. and then removing the hydrogen gas at a temperature in the range of about 200° C. to about 400° C. for forming preliminary catalytic metal particles;
   fourth, impregnating a metal salt solution an amount of solvent ranging from about 0.5 ml to about 3.0 ml per 1 g of carbon support and a second or remaining portion of the catalytic metal precursor wherein the second or remaining portion of the catalytic metal precursor is impregnated into the carbon support;
   fifth, drying the carbon support comprising the impregnated catalytic metal precursor and the preliminary catalytic metal particles; and
   sixth, reducing the carbon support comprising the impregnated catalytic metal precursor and the preliminary catalytic metal particles for forming the high loading supported carbon catalyst, wherein a loading of the supported catalytic metal precursor is in the range of about 30% to about 60% by weight.

2. The method of claim 1, wherein the second reducing step further comprises reducing the catalytic metal precursor using hydrogen gas at a temperature in the range of about 150° C. to about 350° C. and then removing the hydrogen gas at a temperature in the range of about 200° C. to about 400° C.

3. The method of claim 2, wherein a ratio of the catalyst metal precursor used in the first impregnation step and the catalyst metal precursor used in the second impregnation step is in the range of about 0.4:0.6 to about 0.6:0.4.

4. The method of claim 3, wherein the supported catalytic metal is Pt or a Pt alloy.

5. The method of claim 4, wherein an element used in the Pt alloy is one or more selected from the group consisting of Ti, Cr, Mn, Fe, Co, Ni, Cu, Ga, Zr, Hf, Ru, Ir, Pd, Os, Au, Ag and any mixture thereof.

6. The method of claim 4, wherein the supported Pt or Pt alloy has a loading in the range of about 10% to about 60% by weight, wherein the average particle size of the Pt or the Pt alloy is in the range of about 1 nm to about 5 nm, and wherein the carbon supported catalyst has a total specific surface area greater than 200m$^2$/g.

7. The method of claim 1, wherein the carbon support is selected from the group consisting of activated carbon, carbon black, mesoporous carbon, and carbon nanotubes.

8. The method of claim 1, wherein the carbon support has a specific surface area of greater than about 800 m$^2$/g.

9. The method of claim 1, wherein the supported catalytic metal is Pt and the catalytic metal precursor is H$_2$PtCl$_6$.

* * * * *